United States Patent

Van Ausdal et al.

[15] 3,707,090
[45] Dec. 26, 1972

[54] FLUIDIC ACCELEROMETER

[72] Inventors: Robert K. Van Ausdal, La Cresenta; Donald R. Cooper, North Hollywood, both of Calif.

[73] Assignee: The Bendix Corporation

[22] Filed: June 30, 1970

[21] Appl. No.: 51,084

[52] U.S. Cl. ..................................73/515, 137/81.5
[51] Int. Cl. ...............................................G01p 15/02
[58] Field of Search ................73/515, 516; 137/81.5

[56] References Cited

UNITED STATES PATENTS

| | | | |
|---|---|---|---|
| 3,540,290 | 11/1970 | Shinn et al. | 73/515 |
| 3,509,775 | 5/1970 | Evans | 73/515 |

*Primary Examiner*—James J. Gill
*Attorney*—Robert C. Smith and Plante, Hartz, Smith & Thompson

[57] ABSTRACT

Angular and linear acceleration sensing and signal producing means are disclosed, both utilizing an inertial weight member suspended in a frame or housing on flexural pivots such that acceleration forces around the pivot axis cause a movement of the inertial member relative to the housing. A nozzle which is fixed with respect to the housing directs a control stream toward a pair of receiver ports which normally receive equal flows to result in equal pressure recovery. A deflecting orifice is movable with the inertial weight member such that its edges deflect the greater part of the control stream flow into one or the other of the receiver ports to produce a pressure differential proportional to the magnitude of the acceleration sensed. One embodiment includes mechanical feedback means operating through additional flexural pivots to provide position feedback from a controlled device.

8 Claims, 8 Drawing Figures

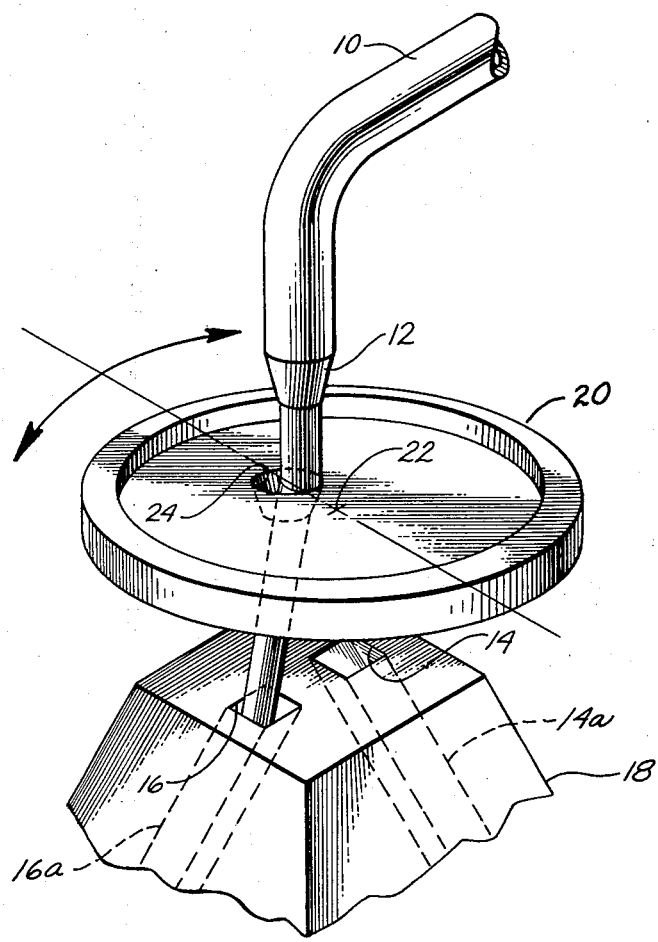

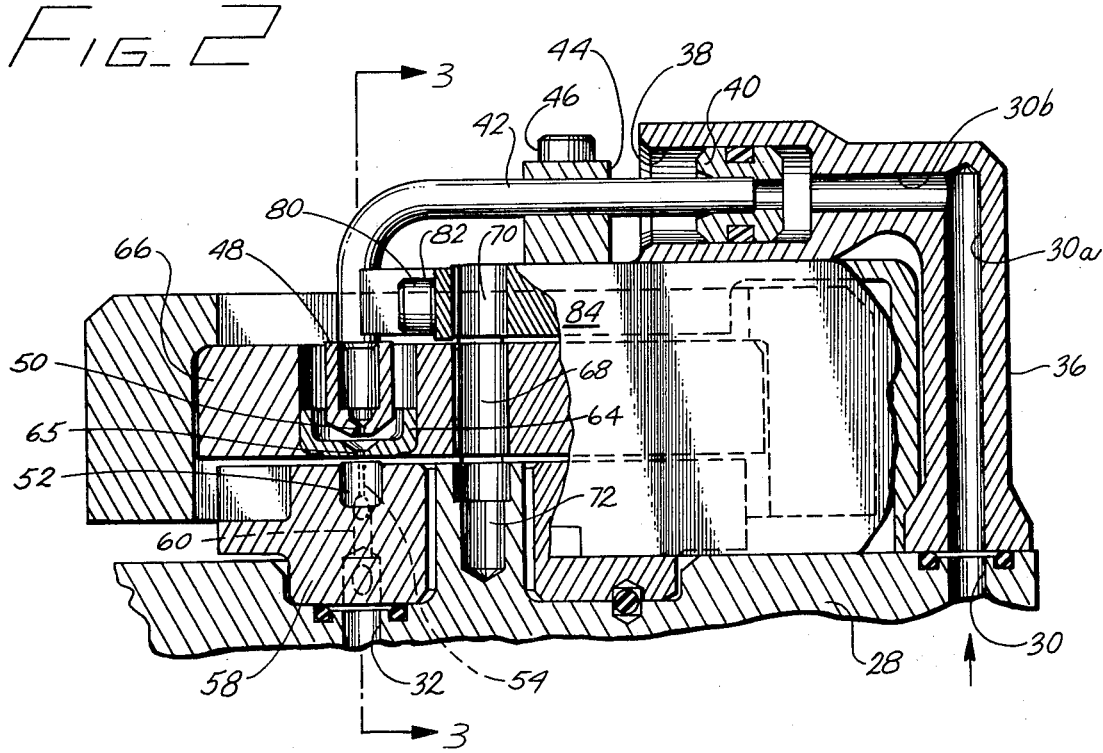
FIG_2
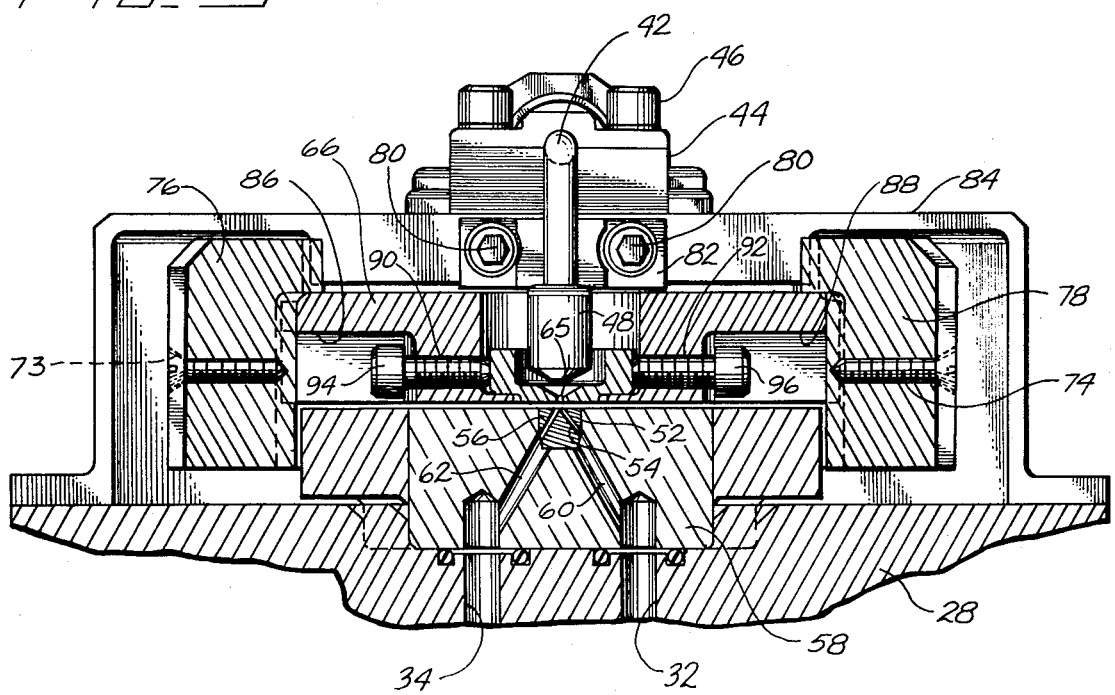
FIG_3

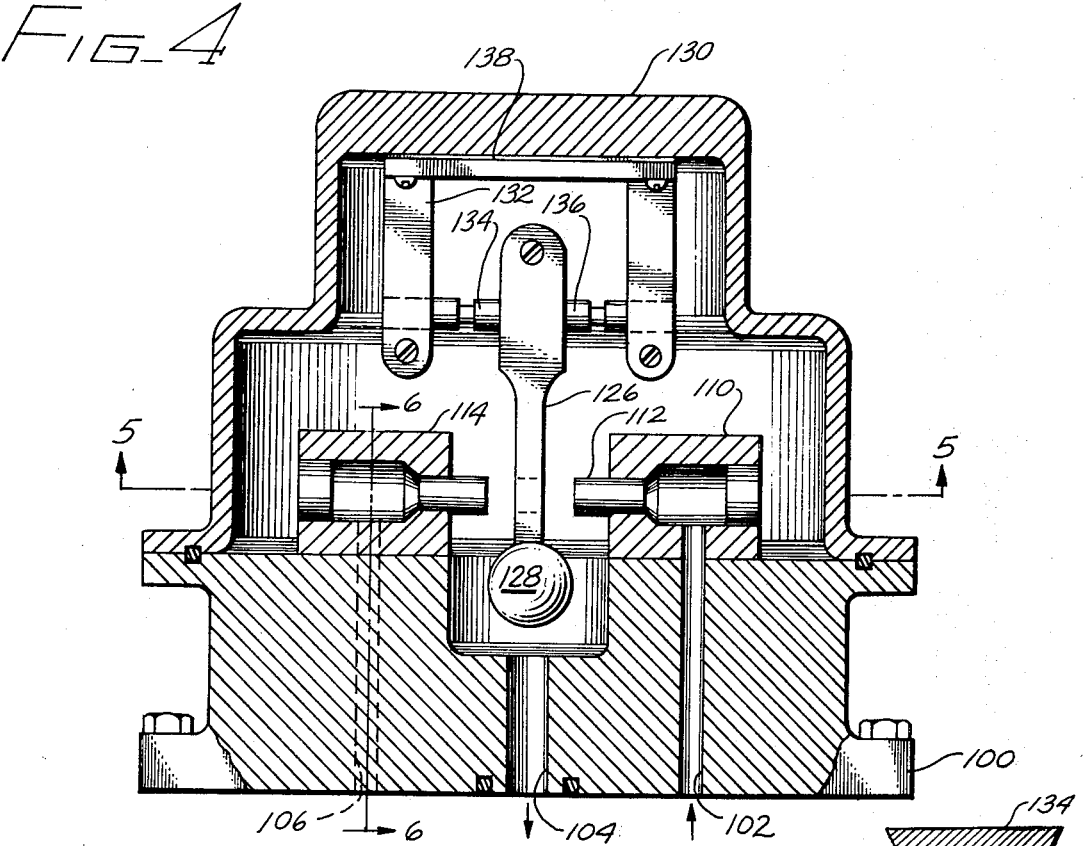
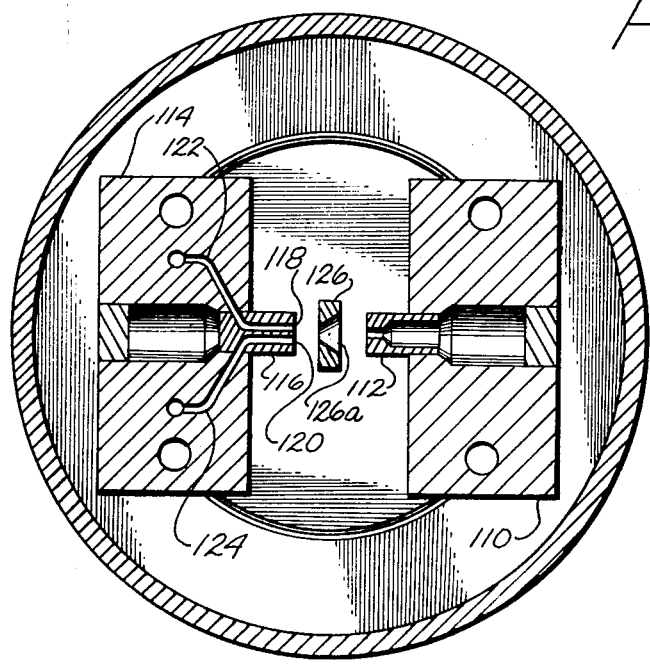
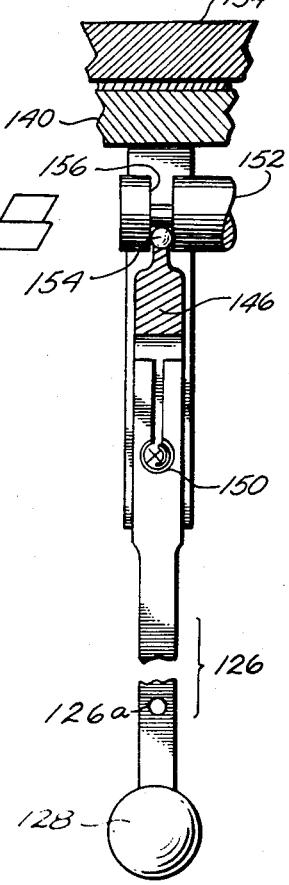

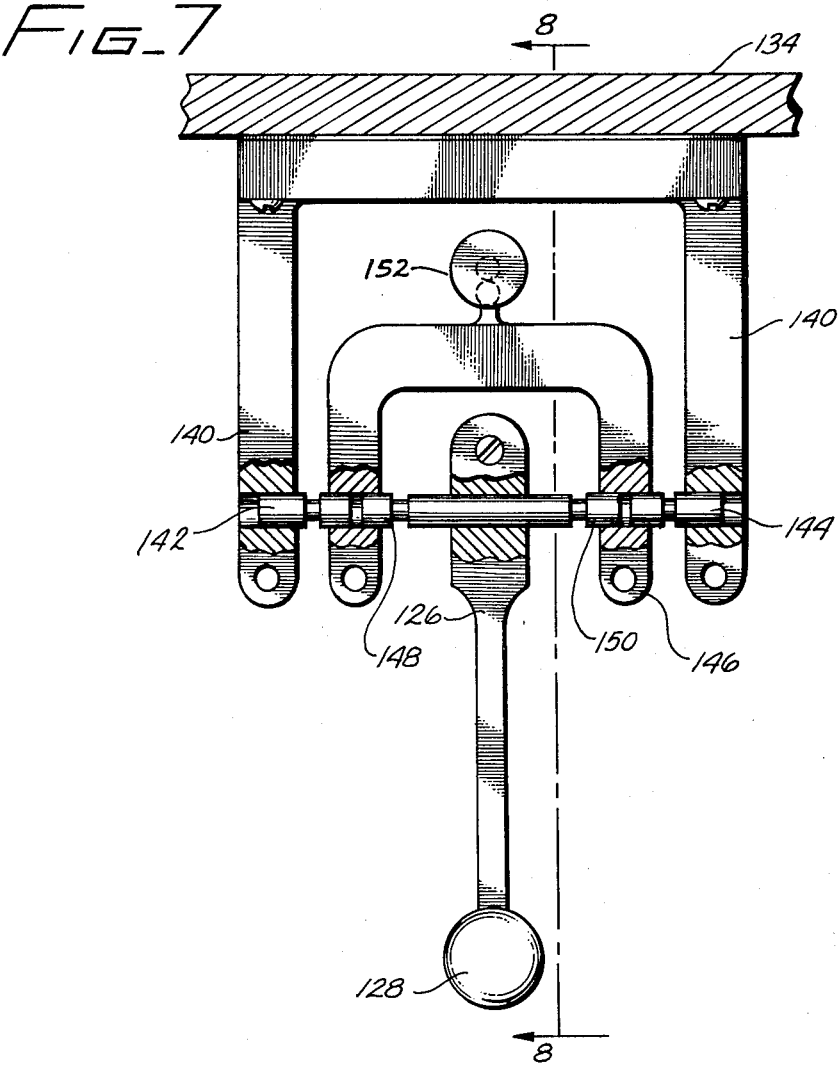
FIG_7
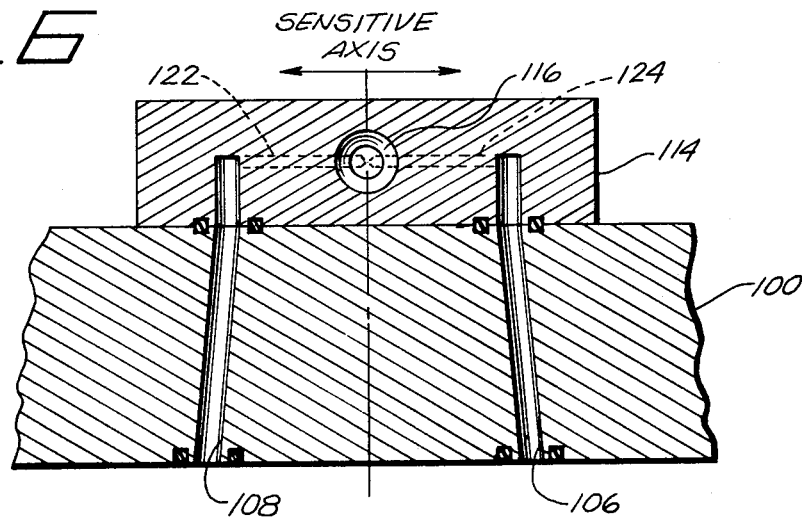
FIG_6

FLUIDIC ACCELEROMETER

BACKGROUND OF THE INVENTION

There are many applications for both linear and angular accelerometers which are structurally simple, reliable, and essentially unaffected by environmental conditions such as temperature extremes or physical shocks. To insure repeatability and a minimum of dead band, it is desired to avoid or minimize mechanical friction between parts. For many applications it is also advantageous to avoid the need for supplying electrical power or processing electrical signals. In response to these needs, a number of fluidic designs have evolved which meet these requirements to some degree. One such design uses a "jet pipe" principle wherein a flexural pipe normally directs a control stream toward a pair of receivers equally and a seismic mass is attached to the outboard end of the jet pipe which responds to an acceleration by causing the pipe to bend, thus directing most of the flow toward one receiver port and correspondingly diminishing the flow to the other port. A portion of the receiver flow is picked off and directed by feedback nozzles against the seismic mass for negative feedback or damping. This and some other fluidic designs are described in an article entitled "Seismic-Fluidic Devices Eliminate Sliding Parts" appearing in *Product Engineering* for Jan. 1, 1970.

SUMMARY OF THE INVENTION

In the present invention, an inertia member is pivotally mounted in a housing and carries a movable deflector which responds to acceleration forces by deflecting a control stream such that the greater part of its flow enters one or the other of two receiver orifices. The deflector includes a sharp edge tapered away from the direction of control stream flow and responds to a very small acceleration force to cause sufficient displacement of the inertia member to divert said control stream. When the deflecting edge is inserted only a small distance into the control stream flow, a deflecting stream is produced which causes the entire control stream to be deflected. Thus the accelerometer has a very high degree of sensitivity and operates to control the control stream with very small physical displacement of the inertia member. The pivotally mounted inertia member is typically mounted in a frame or housing by means of flexural pivots which have little friction and very long life if used with limited travel. One embodiment disclosed uses a generally cylindrical inertia member pivoted at its center such that it senses angular acceleration around its pivot. A second embodiment also uses a pivotally mounted inertia mass, but with said mass mounted to respond to linear acceleration. A mechanical negative or position feedback arrangement is also described which operates through the flexural pivots to urge the deflecting member back toward its neutral position.

DESCRIPTION OF THE DRAWINGS

FIG. 1 is a schematic diagram showing the basic principle of an angular acceleration sensor according to our invention.

FIG. 2 is a side view, partly in section, of a practical angular accelerometer made according to the principle shown in FIG. 1.

FIG. 3 is a sectional view taken along line 3—3 of FIG. 2.

FIG. 4 is a sectional view of a linear acceleration sensor made according to our invention.

FIG. 5 is a sectional view taken along line 5—5 of FIG. 4.

FIG. 6 is a sectional view, somewhat enlarged, taken along line 6—6 of FIG. 4.

FIG. 7 is a plan view of a modification of the device of FIG. 4 to include feedback means.

FIG. 8 is a sectional view, somewhat enlarged, taken along line 8—8 of FIG. 7.

DESCRIPTION OF THE PREFERRED EMBODIMENTS

Referring now to FIG. 1, a pipe 10 directs a flow of fluid from a source, not shown, to a nozzle 12 which normally directs its flow toward a pair of receiver orifices 14 and 16 in the receiver orifices and approximately equal flow enters each of the receiver orifices and approximately equal flow enters each of the respective receiver conduits 14a and 16a. A rotary inertial mass in the form of a flywheel member 20 is pivoted around a vertical axis 22, and a flywheel member 20 thus responds to angular acceleration by rotating around axis 22 as shown by the arrow. A sharp-edged, tapered orifice 24 is cut through the web of flywheel member 20 at a distance from axis 22 such that when an angular acceleration is sensed, the edges of orifice 24 will be rotated around axis 22 and will impinge into the edge of the control stream flowing from nozzle 12. As shown, the flywheel member has rotated slightly counterclockwise, thus causing the orifice 24 to deflect the control stream into receiver 16 and receiver conduit 16a. As is understood by those skilled in the art, this will result in a substantial pressure differential being sensed downstream of orifices 14 and 16 to cause a desired control reaction to be produced.

FIG. 2 shows a side view, partially in section, of an accelerometer made according to our invention for detecting angular acceleration. Operating fluid under pressure is supplied from a source, not shown, though a base member 28, shown partially broken away, which includes an inlet conduit 30 which carries fluid at supply pressure and outlet conduits 32 and 34 (FIG. 3) which carry fluid from the respective receivers. Base member 28 may be of any desired size and shape and may contain a number of conduits, filters, etc. which are important to the operation of an overall system but which are not necessary to an understanding of this particular invention. Fastened by any suitable means to base member 28 is an L-shaped member 36 which may be a casting and which includes passageways 30a and 30b, which are extensions of the inlet passage 30. An enlarged opening 38 receives a slidable sealing member 40 which is hollow to receive a stem 42 which operates as an extension of the inlet conduit 30. Stem 42 and sealing member 40 enable the member 42 to be adjusted laterally. Stem 42 is further supported in a block 44 which includes two parts clamping against stem 42 and held by screws 46. At its lower end, stem 42 is terminated by means of a nozzle member 48 which is positioned such that flow through its orifice 50 is normally directed toward a receiver block 52 which contains receiver orifices 54 and 56 and which is positioned in a larger block 58 including extensions 60 and 62 of receiver passages 54 and 56, respectively (see FIG. 3).

Located between the nozzle member 48 and the receiver block 52 is a deflector member 64 forming part of an inertia member consisting of a cylindrical center portion 66 carried on an axis 68 supported in flexural pivot members 70 and 72. These pivots are well known in the art and typically consist of two separate partial cylindrical members which are connected by thin flexural beams. Adjustably fastened to the outside of cylindrical member 66 by means of screws 73 and 74 (see FIG. 3) are inertial weight members 76 and 78 which are adjustably positioned relative to the cylindrical member 66 to permit precise balance of the inertial assembly. Alternatively, members 76 and 78 may constitute a single member, which may be similarly positioned.

The flexural pivot member 72 is firmly attached to base member 28. The upper flexural pivot member 70 is clamped by means of screws 80 and a retainer block 82 into an upper housing member 84 which is generally shaped like a half cylinder and which is secured to the base member 28 by any suitable means. A central portion of block 82 extends forwardly between the screws 80 to support the stem member 42, so that the center line of nozzle 48 is maintained parallel to axis 68 during lateral adjustment of stem member 42.

In FIG. 3, it will be observed that the cylindrical inertia member 66 includes a pair of interior chambers 86 and 88 leading to threaded passageways 90 and 92, respectively, carrying set screws 94 and 96, respectively, to enable precise positioning of the deflector member 64 relative to the nozzle member 48. In this view, the receiver ports 54 and 56 are seen as well as the extension of these ports 60 and 62 which lead to the outlet ports 32 and 34. Not shown is a return port which carries any flow not recovered by the receiver ports back to the fluid pressure source.

With the device as shown in FIGS. 2 and 3 subjected to no acceleration forces, high pressure fluid will be supplied in the conduit 30 and will flow out of the nozzle orifice 50 across the deflecting orifice 65 and equally into the receiver passages 54 and 56. Thus, there will be an essentially equal pressure recovery downstream of passages 32 and 34. When an angular acceleration is sensed relative to the axis 68, the inertial mass represented by members 66, 76 and 78 will tend to lag this angular movement, thereby causing the deflector member 64 to be moved relative to the receiver block 52 to thereby direct a greater portion of the control fluid flow out of nozzle orifice 50 into one or the other of receiver passages 54 and 56 and thereby resulting in a sensed pressure differential downstream. Since there are no sliding parts or frictional members involved, the only resistance imparted is that of the flexural pivot members 70 and 72, and this is predictable and very small relative to the inertial forces involved. The sensitivity of this apparatus is very high and permits the sensing of acceleration forces of the order of 0.0001 G.

In FIG. 4 is shown a sectional view of a linear acceleration sensor made according to our invention. A base member 100 has drilled therethrough a conduit 102 which serves as an inlet conduit from a high pressure source. A return conduit 104 provides means for returning to the source the fluid not recovered by the receivers. Pressure recovery passages 106 and 108 are also formed in base member 100 (see FIG. 6). Mounted on base 100 is a nozzle block 110 including a nozzle 112 and a receiver block 114 including an insert member 116 containing the receiver orifices 118 and 120. It will be observed that each of nozzle block 110 and receiver block 114 are drilled to provide passageways for inserting the nozzle and receiver orifice members. This detail is shown more clearly in FIG. 5. Receiver block 114 includes a pair of receiver passageways 122 and 124 which form extensions of the orifices 118 and 120, respectively.

Arranged to control the fluid flow between the nozzle 112 and the receiver orifices 118 and 120 is a movable deflector member 126 including an inertial mass 128. Deflector member 126 is suspended from a rigid cover member 130 to which are attached brackets 132. Clamped between brackets 132 and the member 126 are flexural pivot members 134 and 136 which permit the member 126 to rotate around an axis coaxial with these flexural pivot members but which hold it carefully aligned vertically and laterally. Vertical positioning of the bracket 132 may be varied by means of shims 138, as required. This dimension must be held quite close so that the deflecting orifice 126a will be precisely positioned between the nozzle 112 and the receiver orifice member 116. With the structure as shown in FIG. 4, it will be appreciated that the cover member 130 must be quite strong and rigid in order to assure the positive location of the deflector member 126. Alternatively, the cover could be made relatively light, and the deflector member 126 and its associated bracket 132 could be carried on a heavier internally mounted support or spider member.

The device shown in FIG. 7 is quite similar to that shown in FIG. 4 but modified to permit the inclusion of feedback means. Attached to the cover member 134 is a bracket 140 which carries flexural pivot members 142 and 144 which are connected at their opposite end to a yoke member 146. This yoke member is, in turn, adapted to carry the movable deflector member 126 and its inertial weight member 128 on flexure members 148 and 150. This structure is shown in FIG. 8 enlarged to show greater detail of this pivot structure. Here the movable deflection member 126 and inertia weight 128 is shown pivoted around the flexural pivot 150 and tightly secured thereto. Yoke member 146 includes a rounded contact member 154 which is held in an annular groove 156 cut in the end of feedback rod 152.

In considering the operation of the devices shown in FIGS. 4 through 9, it will be observed that the sensitive axis of the device as shown in FIG. 4 is normal to the plane of the paper. Thus, as an acceleration or deceleration is sensed by means of inertia weight member 128, the deflection member 126 will be moved from its normal position to deflect the flow into either of orifices 118 or 120. The deflection of member 126 will thereby produce a pressure differential downstream of the receiver orifices which may then be used to position a second stage spool valve or similar device. Frequently it is desired that some manner of position or negative feedback be supplied to the sensing device to keep the output device from overshooting the desired position. In the modification shown in FIGS. 7 and 8, a feedback rod 152 provides a mechanical movement proportional to the movement of the output device. This movement causes a tilting of the yoke member 146 around its pivot axis in such sense as to create torsional forces on the flexure members 148 and 150 tending to bring deflection member 126 back to its centered position. It will be apparent to those skilled in the art that a number of possible feedback arrangements for devices such as those shown herein are possible. Feedback may be either by means of a mechanical feedback rod or may, in some instances, constitute a pressure feedback arrangement. Where control in only one direction or sense is required, the control stream may be directed normally to one receiver orifice, and response to a control input force is effected by deflecting the stream to the other receiver orifice.

We claim:

1. A fluidic accelerometer comprising a source of fluid under pressure,
    a conduit connected to said source and a nozzle terminating said conduit for directing a control stream,
    receiver means including a pair of receiver orifices aligned with said nozzle such that approximately equal flow of said control stream is directed to each receiver orifice,
    an inertia mass pivotally mounted on an axis parallel to and offset from the direction of flow from said nozzle, said inertia mass including a deflecting orifice having stream-contacting edges converging toward each other along the direction of flow wherein contact of said control stream by means of said contacting edges causes a small deflecting stream to be produced and said deflecting stream actually causes said control stream to be deflected, said orifice being normally in alignment with said nozzle such that when there are no acceleration forces relative to said axis, the flow from said nozzle is not deflected, and when there are acceleration forces relative to said axis, said inertia mass will be displaced and said contacting edges will contact said control stream causing a larger proportion of said control stream to be deflected into one of said receiver orifices and a smaller proportion to flow into the other of said receiver orifices.

2. A fluidic accelerometer as set forth in claim 1 wherein a housing is provided for supporting said inertia mass and said mass is carried in said housing by means of flexural pivot means.

3. A fluidic accelerometer as set forth in claim 2 wherein feedback signal-transmitting means is connected to said inertia mass through forces applied to said flexural pivot means.

4. A fluidic accelerometer comprising a source of fluid under pressure,
    a conduit connected to said source and a nozzle terminating said conduit for directing a control stream,
    receiver means including a receiver block and a pair of receiver orifices in said block aligned with said nozzle such that approximately equal flow of said control stream is directed to each receiver orifice,
    an inertia mass pivotally mounted on an axis parallel to and offset from the direction of flow from said nozzle, including a deflecting orifice having stream-contacting edges converging toward each other along the direction of flow wherein contact of said control stream by means of said contacting edges causes a small deflecting stream to be produced and said deflecting stream actually causes said control stream to be deflected, said orifice normally being in alignment with said nozzle such that when there are no angular acceleration forces relative to said axis, the flow from said nozzle is not deflected, and when there are angular acceleration forces relative to said axis, said inertia mass will be displaced and said contacting edges will contact said control stream causing a larger proportion of said control stream to be deflected into one of said receiver orifices and a smaller proportion to flow into the other of said receiver orifices.

5. A fluidic accelerometer as set forth in claim 4 wherein said inertia mass includes a deflecting orifice member which is adjustably positioned with respect to said inertia mass.

6. A fluidic accelerometer as set forth in claim 4 wherein a housing is provided for supporting said inertia mass and said mass is carried in said housing by means of flexural pivot means.

7. A fluidic accelerometer as set forth in claim 5 wherein a housing is provided for supporting said inertia mass and said mass is carried in said housing by means of flexural pivot means.

8. A fluidic accelerometer as set forth in claim 7 wherein said inertia mass includes a cylindrical member and inertia members adjustably fastened to said cylindrical member.

* * * * *